US006419835B1

(12) United States Patent
Virtanen et al.

(10) Patent No.: US 6,419,835 B1
(45) Date of Patent: *Jul. 16, 2002

(54) METHOD FOR PRODUCING A FILTER CAKE

(75) Inventors: Matti Virtanen; Rolf Hindström, both of Turku (FI)

(73) Assignee: Outokumpu Oyj, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/333,439

(22) Filed: Jun. 15, 1999

(30) Foreign Application Priority Data

Jun. 25, 1998 (FI) .................................................. 981472

(51) Int. Cl.$^7$ ......................... B01D 37/04; B01D 33/15; B01D 33/68
(52) U.S. Cl. ...................... 210/739; 210/741; 210/770; 210/780; 210/785; 210/791; 210/808; 210/331; 210/332; 210/391
(58) Field of Search .................................. 210/808, 739, 210/741, 744, 767, 770, 783, 784, 785, 780, 791, 331, 332, 391

(56) References Cited

U.S. PATENT DOCUMENTS

| 3,708,072 A | * | 1/1973 | Schmidt, Jr. ................. 210/332 |
| 3,724,668 A | * | 4/1973 | Ahlquist ..................... 210/331 |
| 4,357,758 A | | 11/1982 | Lampinen |
| 4,695,381 A | * | 9/1987 | Ragnegard ................... 210/403 |
| 4,929,355 A | * | 5/1990 | Ragnegard et al. .......... 210/331 |
| 4,946,602 A | | 8/1990 | Ekberg et al. |
| 5,039,347 A | | 8/1991 | Hindstrom et al. |
| 5,178,777 A | | 1/1993 | Ekberg et al. |

FOREIGN PATENT DOCUMENTS

| FI | 61739 | 9/1982 |
| FI | 76705 | 12/1988 |
| FI | 82388 | 3/1991 |
| FI | 87539 | 10/1992 |

\* cited by examiner

*Primary Examiner*—Robert J. Popovics

(57) ABSTRACT

The invention relates to a method for producing a solids cake created in filtering performed by a suction drier provided with a fine porous liquid suction surface, in which method there is created, in order to produce said solids cake, a pressure difference in between the filter surface of the fine porous filter medium and the surface opposite to said filter surface. According to the invention, in connection with the filter cake formation, the pressure difference between the filter surface of the fine porous filter medium and the surface opposite to said filter surface is controlled in order to adjust the cake formation speed, and the slurry surface of the suction drier filtering tank is advantageously maintained on a level that enables the use of at least one filter surface cleaning member, essentially throughout the whole filter cake formation process.

11 Claims, No Drawings

METHOD FOR PRODUCING A FILTER CAKE

The present invention relates to a method for producing a filter cake created in filtering. By means of said method, there is achieved a reduction in the residual moisture of the solids cake created particularly in a suction drier, and a control of the thickness of said solids cake.

From the FI patent 61,739, there is known a drying method and apparatus for drying a web-like, pulverous, solid or porous material, in which method the target to be dried is put, by intermediation of a finely divided, liquid-saturated suction surface, to hydraulic contact with the liquid maintained at under pressure with respect to the target to be dried. The apparatus employed in said method comprises a fine porous liquid suction surface, where the radii of the fine pores are mainly within the range of 0.5–2 micrometers.

The fine porous liquid suction surface constitutes the filter surface of the suction drier filter medium, which filter surface is put into contact with the material to be dried, such as slurry. While the filter surface is for instance plane-like, and by creating under pressure on the opposite side with respect to the filter surface of the filter medium, on the filter surface there is formed, owing to the influence of suction, a cake filtered of the material to be dried, which cake is then scraped off the filter surface. In connection with the making of the cake, the porous structure of the filter surface and the filter medium forming the filter surface is gradually filled with the finely divided material to be dried.

Various methods are developed for cleaning the filter surface of a suction drier provided with a fine porous liquid suction surface, for instance the sequential and continuous ultrasonic cleaning methods described in the FI patents 76,705 and 82,388, respectively, as well as the reverse pressure washing method described in the FI patent 87,539. However, attention has not been paid to the creation of the cake itself, which is formed of the finely divided material to be dried, but the cake has been allowed to form essentially freely after switching, on the under pressure, when the filter surface has been cleaned. In order to facilitate rapid cake formation and to maintain the required capacity, the under pressure has been allowed to prevail, starting from the very beginning of the process, at the same level throughout the whole cake formation process. At the beginning of the cake formation, cake is formed essentially rapidly on the cleaned filter surface, wherefore the cake layer created against the filter surface becomes dry and compact owing to effective suction. Now the porous structure of the filter surface is blocked, and further problems related to cake formation arise, affecting, among others, the residual moisture of the cake and the thickness thereof, as well as having their influence on whether the cake remains on the filter surface until the cake removal stage proper begins. A common solution to the problems caused by the thickness and residual moisture of the filter cake has been to shorten the cake formation period by lowering the surface of the slurry contained in the filtering device. The lowering of the slurry surface may prevent the sequential and continuous ultrasonic cleaning of the filter surface, described for instance in the FI patents 76,705 and 82,388.

Consequently, the object of the present invention is to control the properties of the filter cake, produced by a suction drier provided with a fine porous liquid suction surface, during the cake formation process itself, so that the residual moisture and thickness of the cake can be advantageously controlled without essentially lowering the surface of the slurry contained in the filtering device. The essential novel features of the invention are apparent from the appended claims.

In a method according to the invention, the properties of the filter cake, produced by a suction drier provided with a fine porous liquid suction surface, are advantageously controlled by adjusting the compactness of the filter cake, so that in connection with the cake formation, the applied pressure difference between the side on the filter surface of the filter medium and the side opposite to the filter surface is controlled in order to advantageously alter the cake formation speed and to maintain the slurry surface on a level which allows the use of at least one filter surface cleaning member, and when necessary, substantially throughout the whole cake formation period. Thus at least one of the desired filter cake properties, either residual moisture or thickness, can be improved in order to facilitate the further processing of the cake and the cleaning of the filter surface.

According to the invention, the filter cake formation speed is adjusted so that when a suction drier provided with a fine porous liquid suction surface, where the pore size is within the range 0.5–2 micrometers, is ready for cake formation, the pressure difference between the filter surface of the filter medium and the surface opposite to said filter surface is controlled between value zero at the starting point of the cake formation process and the counter pressure value of the capillary force depending on the filtering material, either so that the pressure difference is altered step by step, or so that the pressure difference is adjusted continuously. The pressure difference can also be controlled so that the pressure difference is part of the time altered step by step and part of the time adjusted continuously. Because the filter cake formation speed is dependent on the pressure difference altering rate, it is advantageous for the cake formation that at the beginning there is applied a slower pressure difference formation speed than at the end of the cake formation process. Thus, at the beginning of the cake formation process, it is advantageous to apply stepwise altering of the pressure difference.

When the pressure difference between the filter surface of the filter medium and the surface opposite to said filter surface is at the beginning of the cake formation period increased from the initial value zero bar step by step advantageously to the value 0.5 bar, for instance, also the filter cake begins to be formed onto the filter surface step by step. Thus the layer of the filter cake that is opposite to the filter surface gradually grows more compact, and the created filter cake layer opposite to the filter surface permeates filtering liquid to be removed from the increasingly thick cake more easily than the layer against the filter surface, which already at the beginning of the cake formation process was made compact by virtue of the large pressure difference. Because the filter cake does not, at this initial stage of cake formation, make an essentially compact layer on the suction drier filter surface, an essentially lower pressure level than in the prior art solutions can also be applied at the further cake formation stages.

When applying the method according to the intention, the pressure difference between the filter surface of the filter medium and the surface opposite to said filter surface can also be controlled so that the pressure difference is increased by means of an essentially continuous operation. In that case it is advantageous that the pressure difference changes evenly throughout the cake formation process, or that the adjusting speed of the pressure difference is lowest at the beginning of the cake formation. The pressure difference as such may vary from the initial value zero to the value 3 bar.

When at the various stages of the filter cake formation, there is advantageously applied, according to the invention, the adjusted pressure difference between the filter surface and the surface opposite to said filter surface, the thickness of the filter cake can be adjusted to be such that the filter cake is not by itself detached from the filter surface, and hence does not harm the rest of the process operation. The thickness of the filter cake is essentially dependent on the applied pressure difference, because with a pressure difference of a given quantity, there always is created a filter cake with a given thickness only. Thus, the application of the method according to the invention advantageously facilitates the formation of a filter cake of a desired thickness.

By using the method according to the invention, the residual moisture of the filter cake to be created can also be affected. When applying an advantageously low pressure difference in the cake formation process between the filter surface of the filter medium and the surface opposite to the filter surface, the filter cake becomes essentially advantageous in terms of residual moisture, because by means of pressure difference control, the layer located on the filter surface of the filter cake is made to remain advantageously moist due to the reduced degree of compactness of the filter cake. Because the compactness of the filter cake is thus reduced, the filter cake pores remain larger, in which case the filter cake pores, according to the capillary principle, are more easily drained in the filtering process, and an advantageous residual moisture is thus achieved.

The method according to the invention can advantageously be applied for example to a vacuum filter, to a pressure filter and to filtering in a normal pressure in a suction drier.

Moreover, by employing the method according to the invention, the slurry surface of the filtering tank can advantageously be maintained on a level that enables a simultaneous use of at least one cleaning member of the filter surface, preferably attached to the suction drier or installed in the immediate vicinity of said suction drier, essentially during the whole filter cake formation process when necessary. Thus the slurry surface can advantageously be maintained above the filter surface cleaning member, at least one member such as an ultrasonic device, attached to the suction drier and used for cleaning the filter surface during the cake formation process, essentially throughout the whole filter cake formation process, in order to make the implementation of the cleaning member useful as such. Consequently, when applying the method according to the invention, the ultrasonic cleaning applied to cleaning the filter surface during the filtering process can advantageously be performed essentially continuously. Thus the fine porous suction surface of the filter medium, used in the suction drier, and the filter medium pores can be kept essentially clean, which in part restricts the growing of the pressure difference between the filter surface of the filter medium and the surface opposite to said filter surface. The desired properties of the filter cake, such as thickness and residual moisture, can thus be controlled by applying essentially smaller pressure differences than in the prior art.

What is claimed is:

1. A method for making a solids cake during filtering a liquid slurry in a suction drier filtering tank having a filter medium with a fine porous liquid suction surface, which comprises:

creating a pressure difference between said fine porous surface of said filter medium and a surface opposite to said porous surface of said filter medium, and controlling said pressure difference so as to adjust solids cake formation speed to form a filter cake over time that is substantially uniform in compactness and porous throughout its entire thickness, wherein residual moisture can pass through to said filter when said pressure difference is applied.

2. A method according to claim 1, wherein the pressure difference between the fine porous liquid suction surface of the filter medium and the surface opposite thereto is controlled so that the pressure difference is altered in a stepped fashion over time.

3. A method according to claim 1, wherein the pressure difference between the fine porous liquid suction surface of the filter medium and the surface opposite thereto is controlled so that the pressure difference is altered in a continuous fashion over time.

4. A method according to claim 1 wherein the size of said pores is within the range of 0.5 to 2 micrometers.

5. A method according to claim 1 wherein said pressure difference is varied over time from 0 to 0.5 bar.

6. A method according to claim 1 wherein said pressure difference is varied over time between 0 and 3.0 bar.

7. A method according to claim 1 wherein said pressure difference is varied over time between a value of zero at the start of the cake formation process and the counter pressure value of the capillary force depending on the filtering material.

8. A method according to claim 1, wherein the pressure difference between the fine porous liquid suction surface of the filter medium and the surface opposite thereto is controlled to produce a filter cake of predetermined thickness.

9. A method according to claim 1, wherein the pressure difference between the fine porous liquid suction surface of the filter medium and the surface opposite thereto is controlled to produce a filter cake of predetermined moisture content.

10. A method according to claim 1, wherein the pressure difference between the fine porous liquid suction surface of the filter medium and the surface opposite thereto is controlled to produce a filter cake of predetermined thickness and moisture content.

11. A method according to claim 1, wherein at least one ultrasonic device is used for cleaning the fine porous liquid suction surface.

* * * * *